United States Patent
Killig

(10) Patent No.: US 7,071,753 B2
(45) Date of Patent: Jul. 4, 2006

(54) MULTIPLE CLOCKS WITH SUPERPERIOD

(75) Inventor: Ralf Killig, Boblingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 26 days.

(21) Appl. No.: 10/814,021

(22) Filed: Mar. 31, 2004

(65) Prior Publication Data

US 2004/0232966 A1    Nov. 25, 2004

(30) Foreign Application Priority Data

Apr. 30, 2003    (EP) .................................. 03101192

(51) Int. Cl.
*G06F 1/04* (2006.01)
(52) U.S. Cl. ..................................... 327/291; 327/293
(58) Field of Classification Search ................ 327/147, 327/156, 151, 160, 162, 163, 291, 293, 294, 327/295, 373, 375, 376; 331/17; 713/400
See application file for complete search history.

(56) References Cited

U.S. PATENT DOCUMENTS 5,535,377 A * 7/1996 Parks ......................... 713/400

6,333,653 B1    12/2001 Floyd et al. ................. 327/163
6,754,868 B1 *    6/2004 Bristow et al. ............. 714/744

FOREIGN PATENT DOCUMENTS

JP                11145942 A    *    5/1999

OTHER PUBLICATIONS

Jennings, "On Cycle Borrowing Analyses for Interconnected Chips Driven by Clocks Having Different by Comensurable Speeds," Aug. 4, 1992, pp. 81-88.
Baldan M., Examiner. European Search Report Application No. EP 03 10 1192 dated Oct. 23, 2003.

* cited by examiner

*Primary Examiner*—Linh My Nguyen

(57) ABSTRACT

The invention provides an apparatus adapted for supplying a plurality of clock signals. The apparatus comprises a set of clock signal circuits for generating m clock signals of at least two different signal periods, with m being a natural number, and a superperiod signal-generating unit adapted for deriving, from a dedicated clock signal of said set of clock signals, a first superperiod signal. The signal period of said first superperiod signal is a common multiple of the clock signals' signal periods.

26 Claims, 7 Drawing Sheets

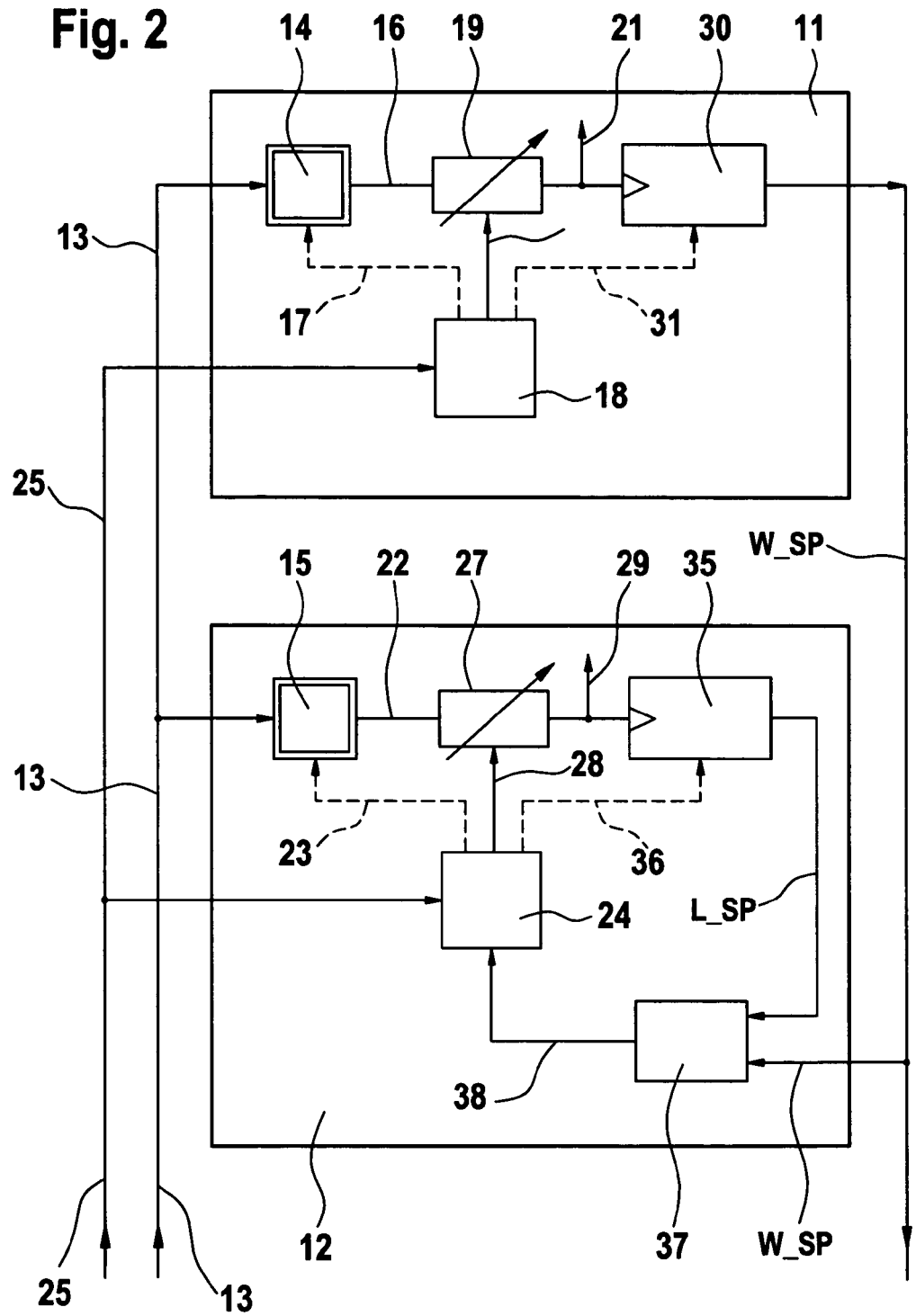

MULTIPLE CLOCKS WITH SUPERPERIOD

BACKGROUND OF THE INVENTION

The present invention relates to the synchronization of a multitude of clock signals, and to establishing well-defined phase relations between said clock signals.

When there exist clock domains with different clock frequencies within a system, data transfer or data exchange between said clock domains might lead to unpredictable results. Transient effects when the system's different clock generators are started are the cause of a random phase relation between the system's different clock signals. Therefore, when data is sent from the domain of a first clock signal to a second clock signal's domain, unpredictable results may occur that are caused by the random phase relations between the different clock signals.

SUMMARY OF THE INVENTION

It is an object of the invention to provide an improved generation of multiple clock signals. The object is solved by the independent claims. Preferred embodiments are shown by the dependent claims.

The apparatus according to the invention comprises a set of clock signal circuits that generate m clock signals of at least two different clock frequencies, whereby m is a natural number. Furthermore, the apparatus comprises a superperiod signal-generating unit that derives a first superperiod signal from a dedicated clock signal of said set of clock signals. The signal period of the first superperiod signal, the "superperiod", is a common multiple of the clock signals' signal periods.

Initially, the m clock signals might have random phase relations relative to each other, whereby the respective phase relation might e.g. depend on the initial conditions when starting the system's clock generators. In order to monitor the phase relations between the different clock signals, the invention provides a first superperiod signal, which is a clock signal with a rather long signal period. One signal period of said first superperiod signal is a common multiple of each of the clock signals' signal periods. For example, in case there is a first clock signal with a signal period of 2 ns and a second clock signal with a signal period of 3 ns, then the superperiod might be chosen as 6 ns, 12 ns, 18 ns, etc. When said first superperiod signal is synchronous with a respective clock signal, then the edges of the first superperiod signal coincide with at least some of the edges of the clock signal. For this reason, the first superperiod signal can be understood as an auxiliary means for analyzing the phase relations of the various clock signals, because it allows to monitor if a respective clock signal is in phase with said first superperiod signal or not. If several clock signals are in phase with the first superperiod signal, then these clock signals are in phase with each other, too.

Optionally, the information obtained by analyzing the phase relations between said clock signals and the first superperiod signal may be used for synchronizing said clock signals to the first superperiod signal. When several clock signals are in phase with the first superperiod signal, this implies that they are in phase with each other as well. This allows establishing well-defined phase relations between clock signals of different frequencies.

The feature that the signal period of the first superperiod signal is a common multiple of the clock signals' signal periods can alternatively be expressed as follows: one superperiod comprises $n_1$ signal periods of a first clock signal, and it comprises $n_2$ signal periods of a second clock signal, etc., whereby said clock signals may have different frequencies. Generally speaking, one superperiod comprises $n_i$ signal periods of the i-th clock signal, whereby the $n_i$ are natural numbers, and whereby i ranges from 1 to m, with m being the total number of clock signals.

According to a preferred embodiment of the invention, the apparatus comprises synchronization means that synchronize at least some of the clock signals to said first superperiod signal. The synchronization facilities shift the phase of a respective clock signal in a way that a defined phase relation between said clock signal and said first superperiod signal is obtained. The random phase relations between the clock signals, which e.g. have been caused by any transient effects when the clock generators start oscillating, are replaced by well-defined phase relations.

In another embodiment, the apparatus comprises a central facility that programs or reprograms the values $n_i$ corresponding to the i-th clock signal, with i ranging from 1 to m. The natural number $n_i$ denotes the number of clock periods of the i-th clock signal within one superperiod. Reprogramming the number $n_i$ allows to vary the length of the superperiod and to generate any desired superperiod signal.

According to another preferred embodiment of the invention, said central facility may program or reprogram the clock frequency of the i-th clock signal, with $1 \leq i \leq m$. By programming or reprogramming at least one of the clock generators of the respective clock signal circuits, any required set of clock frequencies can be generated. The clock signal circuits might e.g. comprise programmable PLLs. In order to adapt the superperiod of the first superperiod signal to the modified clock frequencies, the central facility might also have to reprogram one or more of the values $n_i$, though this is not always necessary. By means of programmable clock generators and programmable superperiod signal generating units, any required set of clock frequencies can be provided.

According to a preferred embodiment of the invention, the lowest common multiple (LCM) of the clock signals' signal periods is chosen as the superperiod of the first superperiod signal. In this embodiment, the natural numbers $n_i$ are chosen as small as possible. In case the superperiod signal generating units are realized by means of counters, rather small counters can be used. Another advantage of using a rather short superperiod is that the time required for synchronizing the clock signals is kept small.

In a preferred embodiment, the superperiod generating unit is realized by means of a first superperiod counter that counts at least one of the rising edges or the falling edges of the dedicated clock signal. The counter period of the first superperiod counter might e.g. be equal to $n_j$, which means that one signal period of the first superperiod signal is generated per $n_j$ clock periods of said dedicated clock signal. The first superperiod counter might e.g. be realized as an upward counter or as a downward counter. In case the superperiod counter is implemented as an upward counter, the counter is reset as soon as the count ($n_j$–1) is reached. Alternatively, the superperiod counter can be realized as a downward counter, with the value ($n_j$–1) being reloaded when the count has reached zero.

According to a further preferred embodiment of the invention, at least some of the clock signals are delayed until a subset of their edges coincide with edges of the first superperiod signal. Any one of the clock signals can be aligned to the first superperiod signal, which serves as a reference. By doing this, defined phase relations are established among the clock signals, though the clock signals have different frequencies.

Preferably, at least some of the clock signal circuits comprise variable delay elements adapted for phase shifting a respective clock signal until it is in phase with the first superperiod signal.

So far, a first superperiod signal that has been derived from a dedicated clock signal has been used for the purpose of synchronization. According to a preferred embodiment of the invention, second superperiod signals are derived from the other clock signals, and said second superperiod signals are synchronized to said first superperiod signal. When the values $n_i$ are chosen appropriately, the second superperiod signals have the same superperiod as the first superperiod signal, and for this reason, the determination of the second superperiod signal's phase relative to the first superperiod signal is simplified.

According to another preferred embodiment of the invention, both a respective clock signal and the corresponding second superperiod signal derived therefrom are delayed together, until the respective second superperiod signal is in phase with the first superperiod signal. When a clock signal is subjected to a certain phase shift, then the second superperiod signal derived from said clock signal is automatically shifted by the same amount. Now, said clock signal (and also the second superperiod signal derived therefrom) are delayed until the phase of the second superperiod signal is aligned with the phase of the first superperiod signal. As a result of this proceeding, also the underlying clock signal is synchronized to said first superperiod signal.

According to another preferred embodiment of the invention, said second superperiod signals are derived from the respective clock signals by means of second superperiod counters. These second superperiod counters count at least one of the rising edges or the falling edges of the underlying i-th clock signal. For example, a superperiod of the corresponding second superperiod signal might be generated for every $n_i$ signal periods of the i-th clock signal.

In case the second superperiod signals are generated by means of said second superperiod counters, the question arises when said counters should be started, in order to achieve that a respective second superperiod signal is not completely out of phase with said first superperiod signal. According to a preferred embodiment, the first superperiod signal is sampled in accordance with the i-the clock signal, and a series of sampling values is obtained. This series of sample values is monitored, and as soon as there is a signal transition, the corresponding second superperiod counter is initialized.

By applying this initialization procedure, it can be achieved that the rising edge of the first superperiod signal is close to the rising edge of the second superperiod signal, though the two superperiod signals are not completely in phase yet. But now, starting from these pre-aligned signals, a rather small additional phase shift of the respective second superperiod signal will be sufficient to arrive at an exact alignment of the two superperiod signals, whereby the required additional phase shift is much smaller than a whole superperiod. The advantage of this initialization procedure is that a rather small variable delay is sufficient for synchronizing the first and the second superperiod signal. Furthermore, as the required additional phase shift is small, the synchronization will become more accurate.

In a preferred embodiment of the invention, the apparatus comprises phase detection units that determine the phase difference between the respective second superperiod signals and the first superperiod signal. One might for example increase the phase shift of a respective second superperiod signal until the phase detection unit indicates that there is no phase delay between said first and said second superperiod signal any more.

Phase detection units can be implemented in a variety of different ways, for example by means of an XOR gate, a set/reset circuit, etc. In a preferred embodiment of the invention, said phase detection units are realized by means of flip-flops. The first superperiod signal is e.g. connected to the flip-flop's clock input, while the second superperiod signal is connected to the flip-flop's data input. In case the second superperiod signal leads in phase relative to the first superperiod signal, a logical "1" is obtained at the flip-flop's output, and in case the second superperiod signal lags in phase relative to the first superperiod signal, a logical "0" is obtained. Alternatively, the first superperiod signal might as well be applied to the flip-flop's data input, while the second superperiod signal might be connected to the flip-flop's clock input. In this case, the signal levels at the flip-flop's output are interchanged.

In order to synchronize the first and the second superperiod signal, the phase delay of the second superperiod signal might e.g. be varied until a transition of the flip-flop's output signal is observed. At the point where the transition occurs, said first and said second superperiod signal are synchronous to each other.

According to a preferred embodiment of the invention, at least some of the clock signal circuits comprise selection means that allow to select, besides the respective clock signal circuit's own clock signal, clock signals of remote clock signal circuits as an output signal. Thus, a clock signal circuit can simultaneously provide clock signals of different clock frequencies to the circuits connected therewith. For example, the clock signal circuits might be linked in order to form a ring of clock signal circuits, whereby on each of the clock signal circuits, both the own clock signal and a clock signal of a preceding clock signal circuit are available.

Preferably, any clock signal of said set of m clock signals may be selected as the dedicated clock signal from which the first superperiod signal is derived. Any of the clock signal circuits may generate the first superperiod signal, which is distributed as a reference signal to the other clock signal circuits. For example, a clock signal circuit having two modes of operation can be employed. In the first mode of operation, the clock signal circuit generates a first superperiod signal that is distributed to the other clock signal circuits. In the second mode of operation, the clock signal circuit synchronizes its own clock signal to a superperiod signal that is generated on the part of a remote clock signal circuit.

According to a preferred embodiment of the invention, the clock signals are utilized in a DUT testing environment. In a testing environment, clock signals are required for providing stimulus signals to a DUT, or for receiving response signals from a DUT, or for both of these purposes. When testing more complicated chips, for example SOCs (Systems on a Chip), a multitude of different clock frequencies might be required, because chips of this kind often comprise a multitude of different clock domains. For example, a first DUT core has to be addressed with a first clock frequency, while for a second DUT core, another clock frequency is required.

Test sequences do not only test one DUT core at a time. There exist test sequences where two or more DUT cores are involved simultaneously, in order to check the interplay between different DUT cores. The clock signals that are required for simultaneously accessing DUT cores of different clock domains must have well-defined phase relations relative to each other, because otherwise, faulty test results might be obtained. Random phase relations between the clock signals may cause unpredictable results. The required set of synchronized clock signals of different clock frequencies can be provided by embodiments of the present invention.

Though embodiments of the invention might be used in an automated test equipment (ATE), use of the invention is not restricted to this application. Embodiments of the present invention might e.g. be utilized in any kind of data processing system where clock signals of different clock frequencies are required. For example, a processing unit might be operated at a rather high clock frequency, while a much lower clock frequency is required for a bus system that cooperates with said processing unit. A phase alignment of the respective clock signals as described above will possibly improve the reliability of data exchange between these functional units.

The invention can be partly or entirely embodied or supported by one or more suitable software programs, which can be stored on or otherwise provided by any kind of data carrier, and which might be executed in or by any suitable data processing unit. Software programs or routines are preferably applied for programming and reprogramming at least one of: the values $n_i$, the clock signal's frequencies, and the delays of the variable delay elements.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

FIG. 2 shows a system of clock boards for generating multiple clock signals of various different clock frequencies;

DETAILED DESCRIPTION OF EMBODIMENTS OF THE INVENTION

The present invention can be utilized whenever a multitude of clock signals of different clock frequencies is required, with said clock signals having well-defined phase relations relative to each other. In the following, the invention will be described with respect to an application in the field of testing. However, the invention is in no way restricted to the field of testing, but can be used in other fields as well. For example, the present invention might be employed for providing a complex system with a plurality of different clock frequencies having well-defined phase relations relative to each other.

Figure 1:
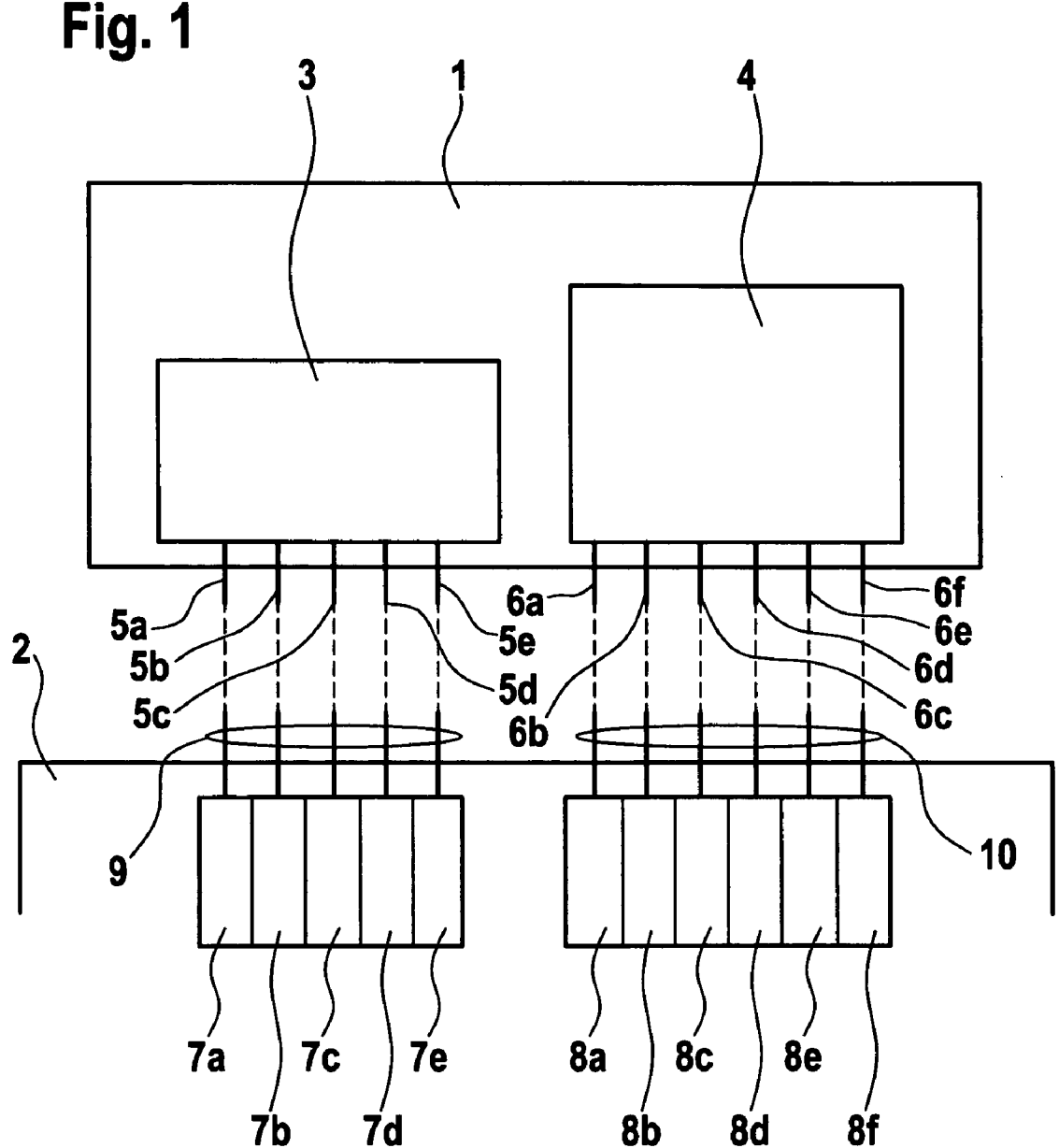
FIG. 1 depicts an automated test environment (ATE) for testing a DUT.

In FIG. 1, a typical test environment is shown. A DUT (Device Under Test) 1 is connected to an ATE (Automated Test Equipment) 2. During a test, the DUT 1 is exposed to various types of stimulus signals generated by the ATE 2, and the responses of the DUT 1 are measured and processed. Usually, the response signals are compared to an expected response of a good device.

The DUT 1 might for example be an integrated circuit. Because of the ever-increasing integration of capabilities on a single integrated circuit, the DUT 1 might comprise various different functional units, such as e.g. random access memories, read-only memories, microprocessor units, digital signal processors, local area network modules, etc. In the following, the term "DUT-core" will be used for generally representing an architectural component within a DUT. A DUT-core is characterized by a behavioral model, signal timing conditions, and by an interface specified in terms of a set of input and output signals.

The DUT 1 shown in FIG. 1 comprises two DUT-cores 3 and 4, whereby each of said DUT-cores represents one or more functional units of the DUT. The DUT-cores 3, 4 might be analogous, digital, or memory DUT-cores. The DUT-core 3 is accessible through the DUT-pins $5a$, $5b$, . . . $5e$, and similarly, the DUT-core 4 can be accessed through the DUT-pins $6a$, $6b$, . . . $6f$.

During test, at least some of the pins of the DUT 1 are connected to the ATE 2.

The automated test equipment 2 shown in FIG. 1 is based on a per-pin architecture, which means that for each of the DUT-pins $5a$, $5b$, . . . $5e$, there exists a corresponding per-pin testing unit $7a$, $7b$, . . . $7e$. Correspondingly, for each of the DUT-pins $6a$, $6b$, . . . $6f$, there is a dedicated per-pin testing unit $8a, 8b$, . . . $8f$. Each DUT-pin of the DUT 1 can be addressed by a corresponding decentralized per-pin testing unit of the ATE 2. The per-pin architecture generally enables high performance and scalability at acceptable costs. Examples for automated test equipments with a per-pin architecture are the Agilent 83000 and 93000 families of Semiconductor Test Systems of Agilent Technologies. Details of those families are disclosed e.g. in EP-A-859318, EP-A-864977, EP-A-886214, EP-A-882991, U.S. Pat. No. 5,499,248, U.S. Pat. No. 5,453,995. The invention is not restricted to ATEs with per-pin architectures, but might as well be used in an ATE with centralized resources.

One or more per-pin testing units together constitute a so-called ATE-port, which is an independent testing unit within the ATE. The DUT-core 3 is accessed by the ATE-port 9, which comprises the per-pin testing units $7a, 7b$, . . . $7e$. In the same way, the DUT-core 4 is accessed by the ATE-port 10, which comprises the per-pin testing units $8a$, $8b$, . . . $8f$.

Each ATE-port is assigned to a corresponding DUT-core and performs a test of the respective DUT-core. Since the ATE-ports represent independent functional units within the ATE, the testing of the addressed DUT-cores in the DUT can be provided not only serially, i.e. the DUT-cores are tested successively, but also in parallel, i.e. more than one DUT-core will be tested concurrently.

The DUT-cores 3, 4 might be analogous, digital, or memory DUT-cores, and they might belong to different clock domains. Therefore, a variety of clock signals with different clock frequencies might be required, in order to provide the DUT with stimulus signals, and in order to receive response signals from the DUT. In case a test sequence involves two or more DUT-cores that belong to different clock domains, there might be a data exchange between the various DUT-cores. The clock signals generated by the ATE are used for clocking data into a respective DUT-core, and for receiving data from a respective DUT-core. In case of random phase relations between the various clock signals, the obtained test results might depend on said random phase relations. For this reason, random phase relations can cause non-predictable test results. It is therefore required that the various clock signals provided by the ATE have well-defined phase relations relative to each other.

FIG. 2 shows a system of clock boards for generating multiple clock signals of various different clock frequencies, whereby said clock signals have well-defined phase relations relative to each other. Such a system of clock boards can be employed in an ATE, but it can also be employed in other fields. The system comprises a first clock board 11 that generates a clock signal of a first frequency, and a second clock board 12 that generates a clock signal of a second frequency. Besides that, the system shown in FIG. 2 might further comprise additional clock boards for generating further clock signals. Each of the clock boards comprises a phase locked loop (PLL) circuit adapted for generating the respective clock signal. A low-frequency reference clock signal 13 of e.g. 10 MHz is provided to the PLL 14 of the first clock board 11, to the PLL 15 of the second clock board 12, and to the PLLs of the other clock boards.

Starting from the reference clock signal 13, the PLL 14 generates a first clock signal 16 with a clock frequency of e.g. 500 MHz, which corresponds to a signal period of 2 ns. In order to generate clock signals of any desired clock frequency, the PLL 14 might be a programmable PLL, whereby the clock frequency of the PLL 14 can be set by means of a frequency programming signal 17. Said frequency programming signal 17 is provided by a control unit 18 located on the first clock board 11.

The first clock signal 16 is forwarded to a variable delay unit 19. The delay of said delay unit 19 is specified by a delay control signal 20 that is also generated by the control unit 18. On the first clock board 11, the delay of the variable delay unit 19 is set to a constant. A delayed first clock signal 21 of 500 MHz is obtained at the output of the variable delay unit 19, and said clock signal is provided to the circuits of the 500 MHz clock domain.

The PLL 15 on the second clock board 12 generates a second clock signal 22. By means of the frequency-programming signal 23, the clock frequency generated by the PLL 15 can be varied within a certain range. The frequency-programming signal 23 is obtained from a control unit 24 located on the second clock board 12. A central control facility (not shown) might forward control signals 25 to the control units 18, 24, e.g. in order to indicate the required clock frequencies.

In the example of FIG. 2, it is assumed that the clock frequency of the second clock signal 22 has been set to 200 MHz, which corresponds to a signal period of 5 ns. The second clock signal 22 is delayed by a variable delay unit 27. The delay of the variable delay unit 27 is adjusted according to a delay control signal 28 that might be obtained from the control unit 24 as well. At the output of the variable delay unit 27, a delayed second clock signal 29 of 200 MHz is obtained, and said clock signal is provided to the circuits of the 200 MHz clock domain.

The next task is to synchronize the system's different clock signals, and to establish well-defined phase relations between clock signals of different frequencies. For this purpose, a superperiod signal is derived from at least one of the system's clock signals, with the signal period of said superperiod signal being a common multiple of all the clock signals' signal periods. One possibility is to choose the lowest common multiple (LCM) of all the signal periods within the system as a superperiod. Any other common multiple of the clock signals' signal periods might be used as well. The signal period of the superperiod signal should not become too large, though.

In our example, the first clock signal 16 has a signal period of 2 ns, and the second clock signal 22 has a signal period of 5 ns. The signal period of the superperiod signal can therefore be chosen as 10 ns (which is the lowest common multiple, LCM, of 2 ns and 5 ns), or as 20 ns, 30 ns, etc. In our example, a superperiod signal with a superperiod of 10 ns is generated by means of a superperiod counter. For each of the clock signals' signal periods, there exists a corresponding natural number by which the respective signal period has to be multiplied in order to obtain one superperiod. For example, the signal period 2 ns of the 500 MHz clock signal has to be multiplied by five in order to obtain a superperiod of 10 ns. Correspondingly, the 5 ns signal period of the second clock board's 200 MHz clock signal has to be multiplied by two. In the following, $n_i$ shall denote the respective natural number by which the signal period of the i-th clock signal has to be multiplied in order to obtain the superperiod signal's signal period. In our example, $n_1=5$, and $n_2=2$.

The delayed first clock signal 21 of the first clock board 11 is input to a superperiod counter 30. At the output of said superperiod counter 30, a superperiod signal W_SP is obtained. Per $n_1=5$ clock cycles of the superperiod counter's input signal, one superperiod of the superperiod signal W_SP is generated.

The superperiod counter 30 either counts the rising edges or the falling edges of the delayed first clock signal 21. The superperiod counter 30 might be implemented as an upward counter or as a downward counter. In case it is realized as an upward counter, the count is reset to zero as soon as the maximum count ($n_1-1$) is reached. In case the superperiod counter is realized as a downward counter, the value $n_1-1$ is reloaded each time the count has reached zero.

The superperiod counter 30 might be implemented as a programmable counter, which means that the value $n_1$ can be set to any desired value. The value $n_1$, denotes the number of periods of the first clock signal per superperiod. For the purpose of reprogramming the value $n_1$, the control unit 18 might provide a superperiod programming signal 31 to the superperiod counter 30.

Figure 3A:
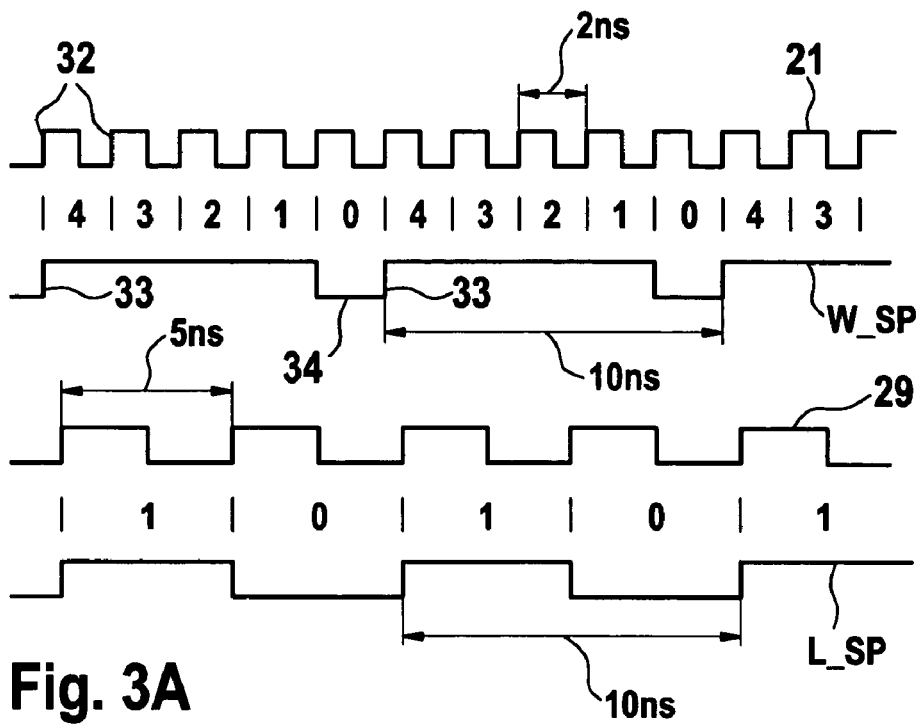
FIG. 3 shows two clock signals together with their corresponding superperiod signals as a function of time.

In FIG. 3A, the delayed first clock signal 21 and the superperiod signal W_SP are depicted as a function of time. The superperiod counter 30 counts the rising edges 32 of the counter's input signal and generates one rising edge 33 of the superperiod signal W_SP for every $n_1=5$ rising edges 32 of the counter's input signal. The superperiod counter 30 is implemented as a downward counter that counts from $n_1-1=4$ down to zero. In FIG. 3A, the respective counts are indicated underneath the delayed first clock signal 21. During the time interval 34, the count is equal to zero, and the superperiod signal W_SP is equal to zero as well. With the next rising edge of the counter's input signal, the value $n_1-1$ is reloaded into the counter. As can be seen from FIG. 3A, the superperiod counter 30 generates one superperiod of 10 ns per $n_1=5$ clock periods of the delayed first clock signal 21.

The superperiod signal W_SP generated by the first clock board 11 is distributed to all the other clock boards of the system, e.g. to the second clock board 12. The superperiod signal W_SP will further on be referred to as the "wiring board superperiod signal".

According to one embodiment of the invention, the second clock board 12 comprises a superperiod counter 35 that generates, from the delayed second clock signal 29, a local superperiod signal L_SP with a superperiod of 10 ns. The superperiod counter 35 counts the edges of the delayed second clock signal 29, and generates one superperiod per $n_2=2$ signal periods of the counter's input signal. Therefore, as shown in FIG. 3A, each signal period of the superperiod signal L_SP corresponds to two signal periods of the delayed second clock signal 29. In the example of FIG. 3A, the superperiod counter 35 is implemented as a downward counter that counts from $n_2-1=1$ down to zero. The respective counts are indicated underneath the delayed second clock signal 29. Alternatively, the superperiod counter might be implemented as an upward counter. Furthermore, the superperiod counter 35 might be realized as a programmable counter, whereby the counter period $n_2$ can be set to any desired value. The counter period $n_2$ might be programmed or reprogrammed by means of a counter period programming signal 36 that is provided by the control unit 24.

In a preferred embodiment, the control unit 18 may set both the frequency of the PLL 14 and the counter period $n_1$ of the superperiod counter 30. The control unit 24 may set the frequency of the PLL 15, the delay of the variable delay unit 27, and the counter period $n_2$ of the superperiod counter 35. This allows to set the clock frequencies to any desired frequency, and to adapt the natural numbers $n_1$ and $n_2$ in a way that the respective superperiods of the superperiod signals W_SP and L_SP are equal to each other.

Figure 3B:
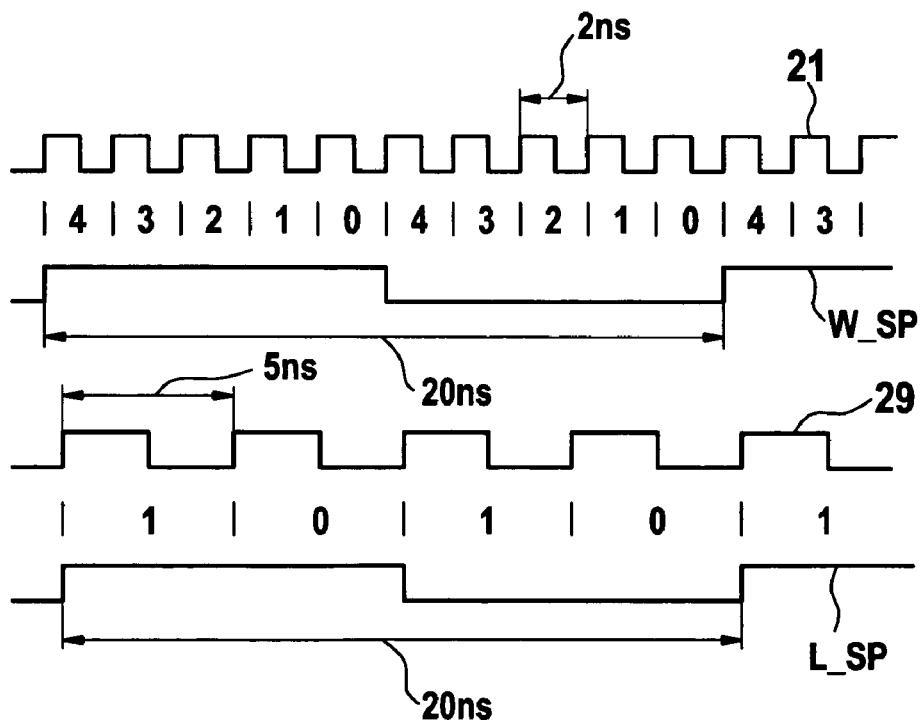

In FIG. 3B, an alternative way of generating the superperiod signals W_SP and L_SP is shown. As in FIG. 3A, the delayed first clock signal 21, the superperiod signal W_SP, the delayed second clock signal 29 and the superperiod signal L_SP are depicted as a function of time. In the embodiment shown in FIG. 3B, the high phase of the superperiod signal W_SP corresponds to $n_1=5$ clock periods of the delayed first clock signal 21, and the low phase of the superperiod signal W_SP also corresponds to $n_1=5$ clock periods of the delayed first clock signal 21. The respective counter values of the superperiod counter 30 are depicted underneath the delayed first clock signal 21. One signal period of the superperiod signal W_SP is generated per $2 \cdot n_1=10$ signal periods of the delayed first clock signal 21. The embodiment of FIG. 3B allows to generate a superperiod signal W_SP with a duty cycle of 1:2.

The superperiod signal L_SP is generated accordingly. As shown in the lower part of FIG. 3B, the high phase of the superperiod signal L_SP corresponds to $n_2=2$ clock periods of the delayed second clock signal 29, and the low phase of the superperiod signal L_SP also corresponds to $n_2=2$ clock periods of the delayed second clock signal 29. Underneath the delayed second clock signal 29, the respective counter values of the superperiod counter 35 are indicated. In the embodiment of FIG. 3B, one signal period of the superperiod signal L_SP is generated per $2 \cdot n_2=4$ signal periods of the delayed second clock signal 29, whereby the duty cycle of L_SP is equal to 1:2.

Both the wiring board superperiod signal W_SP and the local superperiod signal L_SP are provided to a phase detector 37, and there, the phase of the local superperiod signal L_SP relative to the wiring board superperiod signal W_SP is determined. As a result, the phase detector 37 generates a phase compare signal 38 that indicates whether the local superperiod signal L_SP lags or leads in phase relative to the wiring board superperiod signal W_SP, which is used as a reference. For example, a logic level "O" of the phase compare signal 38 might indicate a phase lead of L_SP relative to W_SP, while a logic level "1" of the phase compare signal 38 might indicate a phase lag of L_SP relative to W_SP. The phase compare signal 38 is forwarded to the control unit 24. In dependence on the phase compare signal 38, the delay of the variable delay unit 27 is varied by the control unit 24. The aim is to modify the delay induced by the variable delay unit 27 in a way that a phase coincidence between the local superperiod signal L_SP and the wiring board superperiod signal W_SP is established. In case there is a phase lag of L_SP relative to W_SP, the delay control signal 28 has to be modified such that the delay of the variable delay unit 27 is reduced. In case of a phase lead of L_SP relative to W_SP, the delay of the variable delay unit 27 has to be increased. The control unit 24 is responsible for generating a suitable delay control signal 28 in accordance with the phase compare signal 38.

Figure 4A:
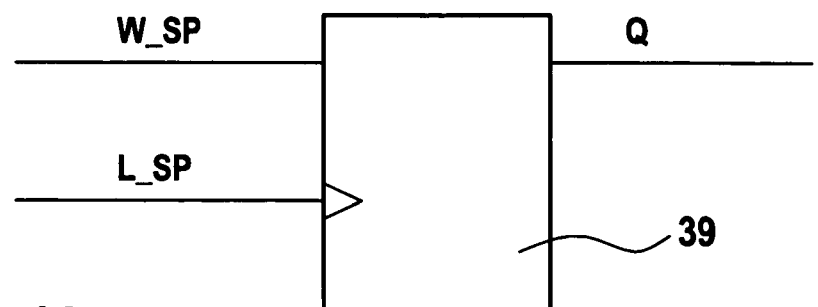
FIG. 4 shows a phase detection unit adapted for detecting the relative phase of the signals W_SP and L_SP.

The phase detector 37 can be implemented in a variety of different ways, e.g. by means of XOR-gates, by means of set/reset circuits, etc. FIG. 4A shows how the phase detector 37 can be implemented by means of a flip-flop 39. The local superperiod signal L_SP is supplied to the clock input of the flip-flop 39, while the wiring board superperiod signal W_SP is forwarded to the flip-flop's data input D. The superperiod signal W_SP at the data input D is sampled according to the superperiod signal L_SP. Each time a rising edge of the superperiod signal L_SP occurs, the value of the signal W_SP is captured. The obtained sample values are provided, as a phase compare signal Q, at the flip-flops's output.

Figure 4B:
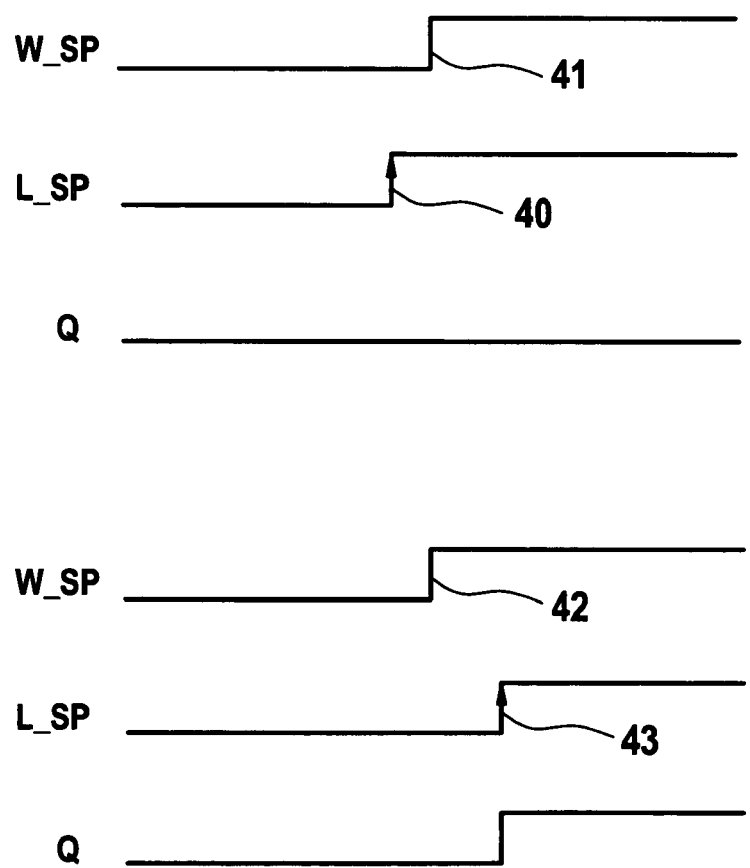

In FIG. 4B, the superperiod signals W_SP and L_SP are shown as a function of time, together with the output signal Q. The rising edge 40 of L_SP precedes the rising edge 41 of W_SP. Because L_SP is provided to the flip-flop's clock input, W_SP is sampled at the instant of time defined by the rising edge 40. At this point of time, the signal level of W_SP is equal to "0", and the output signal Q will be equal to "0" as well. This means that the delay of the variable delay unit 27 has to be increased.

In FIG. 4C, a different situation is shown in which there is a phase lag of L_SP relative to W_SP. The rising edge 42 of W_SP precedes the rising edge 43 of L_SP. The superperiod signal W_SP is sampled at the point of time defined by the rising edge 43, and the signal level "1" appears at the flip-flop's output. A signal level "1" of the phase compare signal Q indicates that the delay of the variable delay unit 27 has to be decreased.

When the superperiod counter 35 starts counting at an arbitrary point of time, the local superperiod signal L_SP will have an arbitrary phase delay relative to the signal W_SP, and in order to compensate said phase delay, the variable delay unit might have to be set to a rather large delay value. In order to restrict the required delay to small values, it is suggested to initialize the superperiod counter 35 in dependence on a signal transition of the wiring board superperiod signal W_SP.

Figure 5A:
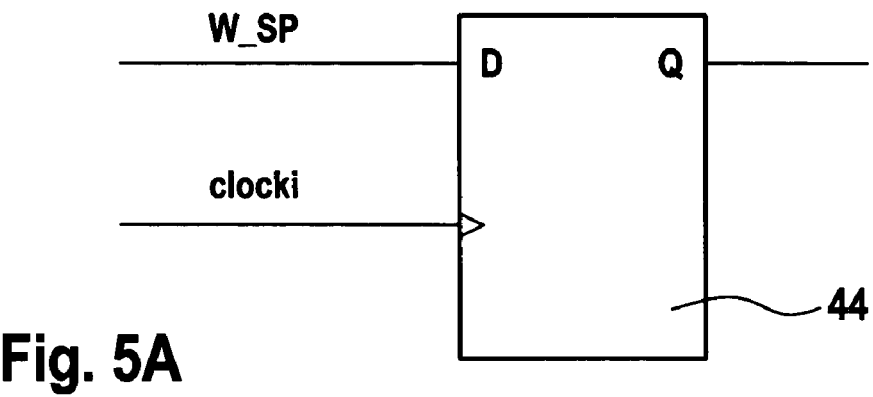
FIG. 5 shows a circuit that can be used for initializing a superperiod counter.

FIG. 5A shows a circuit that can be used for determining the instant of time at which the superperiod counter should be reset or initialized. The circuit comprises a flip-flop 44, whereby the i-th clock signal is applied to the flip-flop's clock input, and whereby the wiring board superperiod signal W_SP is applied to the flip-flop's data input. With each rising edge of the i-th clock signal, a sampling value of the wiring board superperiod signal W_SP is obtained. The respective sampling values of W_SP are provided as an output signal of the flip-flop 44.

Figure 5B:
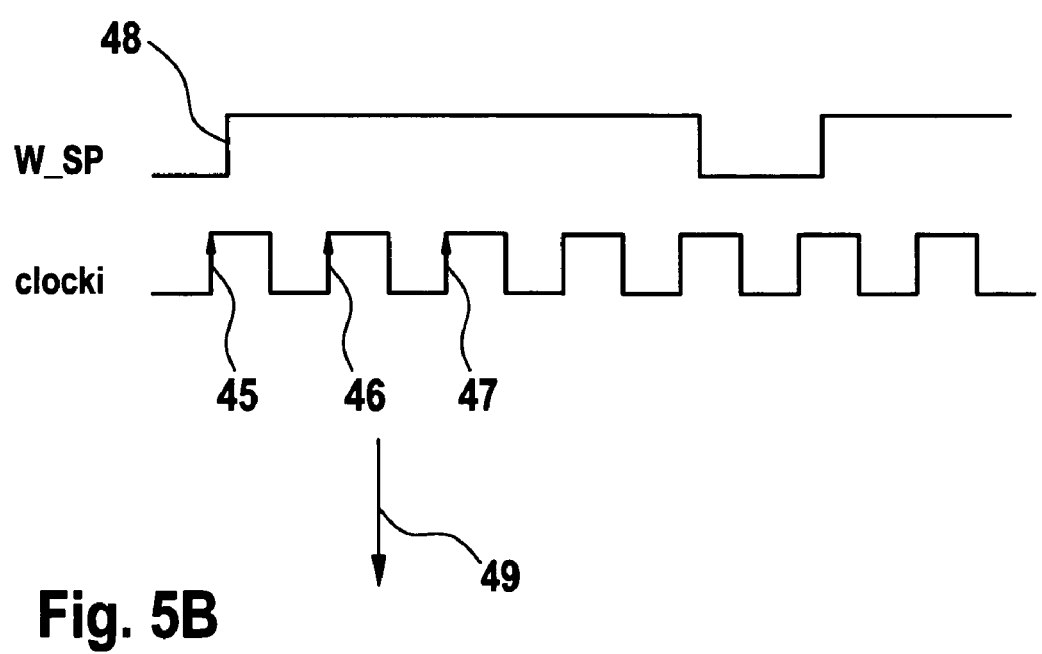

FIG. 5B shows the superperiod signal W_SP, the i-th clock signal, and the flip-flop's output signal as a function of time. For each of the rising edges 45, 46, 47 of the i-th clock signal, a corresponding sample value of W_SP is obtained. The rising edge 45 precedes the signal transition 48 of W_SP, and the sample value "0" is obtained. At the point of time defined by the rising edge 46, the signal transition 48 of W_SP has already taken place, and therefore, the sample value "1" is obtained. By monitoring the obtained sample values, the signal transition of W_SP can be detected. As soon as a signal transition of W_SP from "0" to "1" has been detected, the superperiod counter is initialized. Because one clock cycle has been omitted, the count of the superperiod counter has to be incremented by one (in case an upward counter is used) or decremented by one (in case a downward counter is employed) in order to compensate for the missing clock cycle. In case the superperiod counter is realized as an upward counter, the counter is set to +1. In case the superperiod counter is realized as a downward counter, the value $(n_i-2)$ is loaded into the counter. By initializing the respective superperiod counter in dependence on a signal transition of the superperiod signal W_SP, it can be achieved that the two superperiod signals W_SP and L_SP are not completely out of phase relative to each other.

Figure 6:
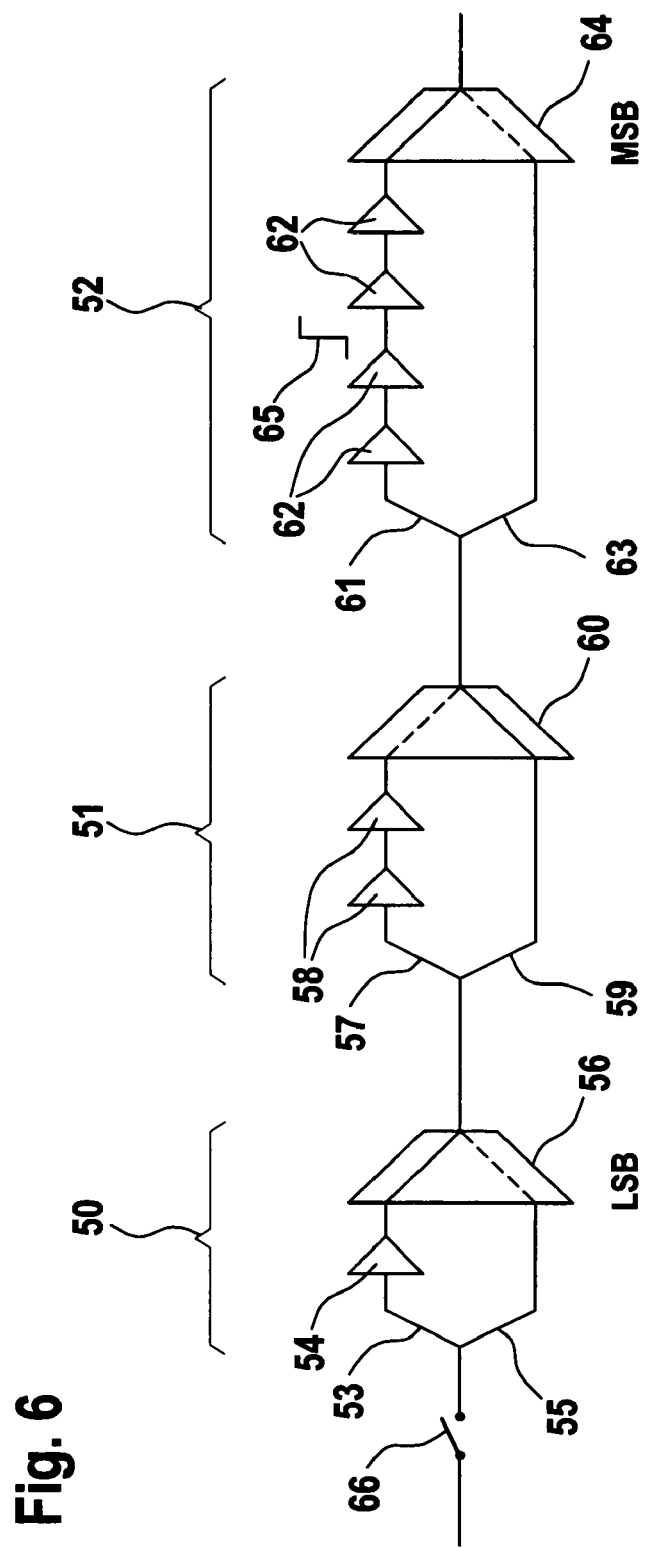
FIG. 6 gives a circuit diagram of a digital delay unit.

FIG. 6 shows how the variable delay units 19, 27 can be implemented as digital delay units. The digital delay unit of FIG. 6 comprises three stages 50, 51, 52. The upper branch 53 of the first stage 50 comprises one delay element 54, while the lower branch 55 of the first stage 50 comprises no delay elements at all. By means of the multiplexer 56, it is possible to select either the delayed signal of the upper branch 53 or the non-delayed signal of the lower branch 55 as an output signal of the first stage 50. On the part of the second stage 51, the upper branch 57 comprises two delay elements 58, and the lower branch 59 does not comprise any delay elements. The multiplexer 60 allows to select either the signal of the upper branch 57 or the signal of the lower branch 59 as an output signal. Correspondingly, the third stage 52 comprises an upper branch 61 with four delay elements 62, and a lower branch 63 without any delay elements. Either the signal of the upper branch 61 or the signal of the lower branch 63 is selected by the multiplexer 64. By programming the multiplexers 56, 60, 64 accordingly, any desired number of delay elements between zero and seven can be included in the signal path. The desired delay might be programmed by means of a bit pattern, whereby the least significant bit (LSB) of the bit pattern is provided to the multiplexer 56, and whereby the most significant bit (MSB) of the bit pattern is provided to the multiplexer 64.

Problems might arise when the delay of the variable delay unit shown in FIG. 6 is reprogrammed. As a first example, let us assume that there is a (rising or falling) edge 65 of a respective signal that traverses the upper branch 61 of the third stage 52. Now, the multiplexer 64 might switch from the upper branch 61 to the lower branch 63. When switching of the multiplexer occurs before the edge 65 has reached the multiplexer 64, the respective edge will be omitted in the output signal.

According to a second example, the multiplexer 64 might be switched from the lower branch 63 to the upper branch 61 immediately after an edge of a respective signal has reached the multiplexer 64. In this case, one might obtain two pulses (instead of one) at the multiplexer's output.

A solution to these problems is provided by the following procedure: Whenever the delay has to be reprogrammed, the switch 66 at the input of the variable delay unit is opened for k clock periods, with k being a natural number. Then, the respective multiplexers are reprogrammed, and then, the switch 66 is closed. Now, k clock cycles have been omitted, and therefore, the count of the respective superperiod counter has to be incremented (in case an upward counter is used) or decremented (in case a downward counter is employed) by k, in order to compensate for the missing clock cycles.

Alternatively, the variable delay units 19,27 might be implemented as analogue delay units, whereby the delay of said analogue delay units may be set by an analogue control signal.

Figure 7:
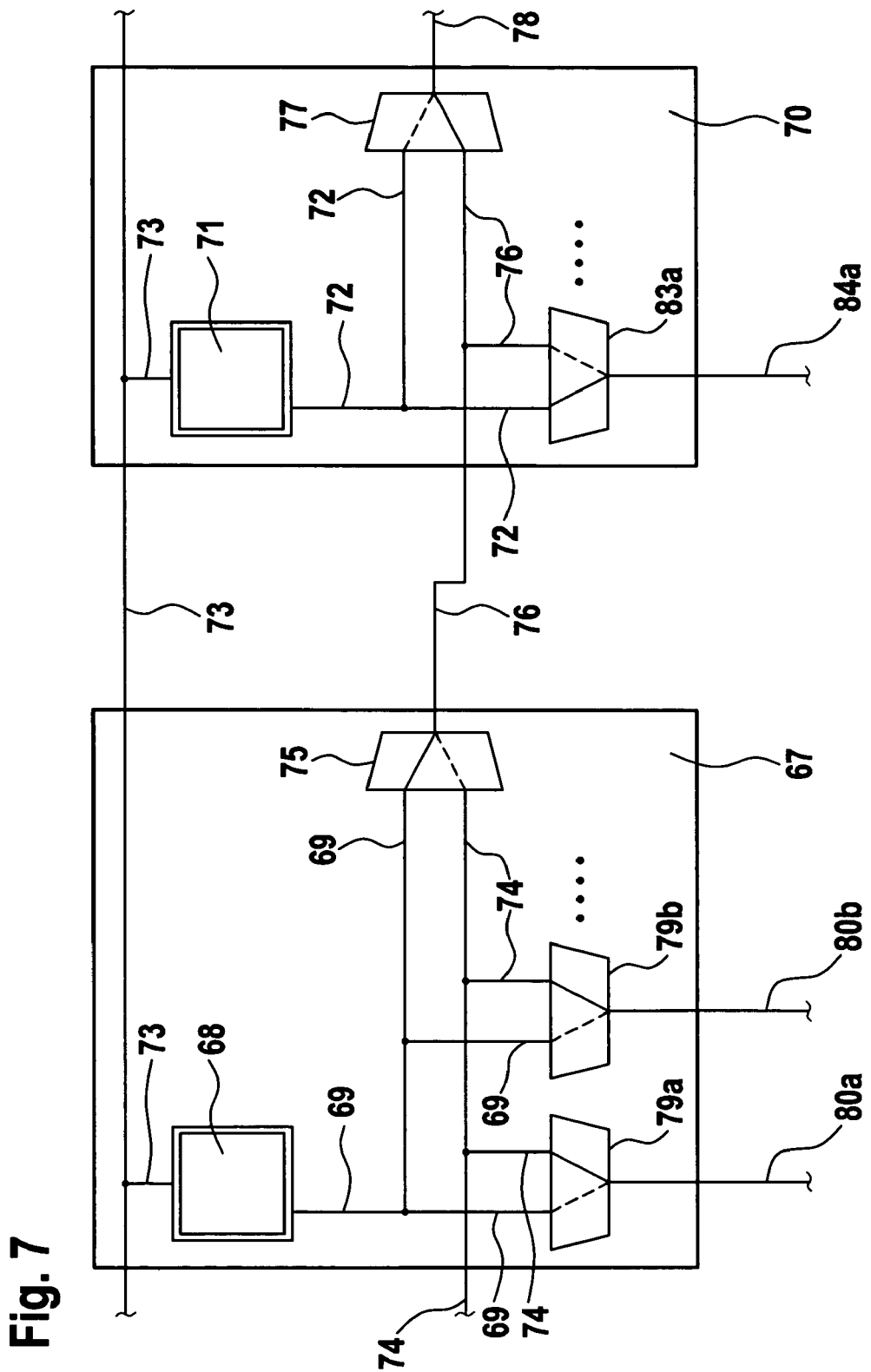
FIG. 7 shows how the system's clock boards can be connected to form a ring structure.

FIG. 7 shows a set of clock boards for generating a plurality of clock signals for an automated test equipment (ATE). On a first clock board 67, a first clock generator 68 generates a first clock signal 69, and on a second clock board 70, a second clock generator 71 generates a second clock signal 72. Both the first and the second clock generators 68, 71 are provided with a reference clock signal 73.

The system's various clock boards are connected in order to form a ring structure. Via this ring structure, the first clock board 67 receives a clock signal 74 from a preceding clock board. On the first clock board 67, the multiplexer 75 allows to select either the clock signal 74 from the preceding clock board or the first clock signal 69 from the first clock board 67. The selected clock signal is forwarded, as a clock signal 76, to the second clock board 70. The multiplexer 77 on the second clock board is provided with the second clock signal 72 and with said clock signal 76. The multiplexer 77 selects one of said two clock signals as a clock signal 78, and said clock signal 78 is forwarded to the subsequent clock board of the ring structure. Thus, clock signals are passed from one clock board to a subsequent clock board. The last one of the sequence of clock boards will provide the clock signal 74 to the first clock board 67.

A test equipment comprises a set of card cages, whereby a card cage typically comprises one clock board and e.g. eight channel boards. Dependent on the respective embodiment, there might exist 16, 32 or even 64 channels per channel board. Said channels provide stimulus signals to a DUT and receive response signals from the DUT.

Each of the clock boards 67, 70 shown in FIG. 7 has to provide clock signals to e.g. eight different channel boards. On each of the clock boards 67, 70, two different clock signals are available. The first clock board 67 comprises eight multiplexers 79*a*, 79*b*, . . . , whereby each of said multiplexers is assigned to a corresponding channel board. The multiplexer 79*a* permits to select either the first clock signal 69 or the clock signal 74 as a channel clock signal 80*a* for the first channel board. Accordingly, the multiplexer 79*b* allows to choose one of the two clock signals 69, 74 as a channel clock signal 80*b* for the second channel board, etc. Thus, each of the channel boards can be individually provided with a selected channel clock signal.

The second cock board 70 also has to provide channel clock signals for eight different channel boards. For this purpose, the second clock board comprises eight multiplexers 83*a*, . . . , whereby each of said multiplexers allows to select either the second clock signal 72 or the clock signal 76 as a corresponding channel clock signal 84*a*, . . . Instead of utilizing a ring structure, a so-called switch fabric might be used for exchanging clock signals between the various clock boards.

The invention claimed is:

1. An apparatus for supplying a plurality of clock signals, said apparatus comprising:
   a set of clock signal circuits for generating m clock signals of at least two different signal periods, with m being a natural number; and
   a superperiod signal generating unit for deriving, from a dedicated clock signal of said set of clock signals, a first superperiod signal, having a signal period that is a common multiple of the clock signals' signal periods.

2. The apparatus of claim 1, wherein one signal period of said first superperiod signal comprises $n_i$ signal periods of a respective i-th clock signal, whereby $n_i$ is a natural number, and $1 \leq i \leq m$.

3. The apparatus according to claim 1, wherein at least some of said clock signal circuits comprise synchronization facilities for synchronizing at least some of said clock signals to said first superperiod signal.

4. The apparatus of claim 2, further comprising a central facility for programming or reprogramming the respective value $n_i$ corresponding to the i-th clock signal, for any i with $1 \leq i \leq m$.

5. The apparatus of claim 2, further comprising a central facility for programming or reprogramming at least one of:
the clock frequency of the i-th clock signal, for any i with $1 \leq i \leq m$, or
the respective value $n_i$ corresponding to the i-th clock signal.

6. The apparatus according to claim 1, wherein the signal period of said first superperiod signal is a lowest common multiple of the clock signals' signal periods.

7. The apparatus according to claim 1, wherein said superperiod signal generating unit comprises a superperiod counter for generating one superperiod of said first superperiod signal per $n_j$ signal periods of said dedicated clock signal.

8. The apparatus according to claim 1, wherein at least some of said clock signal circuits delay their respective clock signal in a way that at least some edges of a respective clock signal coincide with edges of said first superperiod signal.

9. The apparatus according to claim 1, wherein at least some of said clock signal circuits comprise variable delay elements for compensating a relative phase delay between a respective clock signal and said first superperiod signal.

10. The apparatus according to claim 1, wherein at least some of said clock signal circuits derive second superperiod signals from respective clock signals and synchronize said second superperiod signals to said first superperiod signal.

11. The apparatus of claim 10, wherein
at least some of said clock signal circuits delay both their respective clock signal and a respective second superperiod signal derived therefrom in a way that the respective second superperiod signal is in phase with said first superperiod signal.

12. The apparatus according to claim 10, wherein at least some of said clock signal circuits comprise a superperiod counter for generating one superperiod of a respective second superperiod signal per $n_j$ signal periods of a corresponding i-th clock signal.

13. The apparatus according to claim 12, wherein at least some of said clock signal circuits comprise counter initialization units that sample said first superperiod signal in accordance with the corresponding i-th clock signal in order to obtain a series of sampling values, and that perform an initialization of a corresponding superperiod counter in dependence on a signal transition of said sampling values.

14. The apparatus according to claim 10, wherein at least some of said clock signal circuits comprise phase detection units for determining a relative phase delay between a respective second superperiod signal and said first superperiod signal.

15. The apparatus according to claim 14, wherein said phase detection units are realized by means of flip-flops, wherein said first superperiod signal is applied to the flip-flop's clock input, and wherein the respective second superperiod signal is applied to the flip-flop's data input, or vice versa.

16. The apparatus according to claim 10, wherein at least some of said clock signal circuits comprise variable delay elements for compensating a relative phase delay between a respective second superperiod signal and said first superperiod signal.

17. The apparatus according to claim 1, wherein at least some of said clock signal circuits comprise clock selection facilities that allow to select, besides the clock signal circuit's own clock signal, a clock signal of a remote clock signal circuit as an output signal of said clock signal circuit.

18. The apparatus according to claim 1, wherein any clock signal of said set of clock signals is selectable as said dedicated clock signal.

19. The apparatus according to claim 7, wherein said superperiod counter is a programmable superperiod counter, wherein a respective signal period $n_j$ can be programmed or reprogrammed.

20. The apparatus according to claim 1, wherein said clock signals are utilized in a DUT testing environment for at least one of providing stimulus signals to a DUT or receiving response signals from the DUT.

21. An automated test equipment comprising:
test circuitry for testing a DUT, said test circuitry being responsible for at least one of: providing stimulus signals to said DUT, and receiving response signals from said DUT;
an apparatus according to claim 1, wherein said apparatus provides a plurality of clock signals to said test circuitry.

22. The automated test equipment of claim 21, wherein at least one of the clock frequency of an i-th clock signal, for any i with $1 \leq i \leq m$, or a respective value $n_j$ corresponding to the i-th clock signal, for any i with $1 \leq i \leq m$, is adapted to the clock domains of the DUT.

23. Data processing system comprising an apparatus for supplying a plurality of clock signals, said apparatus comprising
a set of clock signal circuits for generating m clock signals of at least two different signal periods, with m being a natural number; and
a superperiod signal generating unit for deriving, from a dedicated clock signal of said set of clock signals, a first superperiod signal having a signal period that is a common multiple of the clock signals' signal periods.

24. A method for supplying a plurality of clock signals, comprising the steps of
generating m clock signals of at least two different signal periods, with m being a natural number; and
deriving, from a dedicated clock signal of said set of clock signals, a first superperiod signal having a signal period that is a common multiple of the clock signals' signal periods.

25. The method of claim 24, further comprising a step of synchronizing at least some of said clock signals to said first superperiod signal.

26. A software program or product, preferably stored on a data carrier, that provides instructions for a processor to execute steps of:
generating m clock signals of at least two different signal periods, with m being a natural number; and
deriving, from a dedicated clock signal of said set of clock signals, a first superperiod signal having a signal period that is a common multiple of the clock signals' signal periods.

* * * * *